(12) United States Patent
Moini et al.

(10) Patent No.: US 6,375,902 B1
(45) Date of Patent: Apr. 23, 2002

(54) METHOD, APPARATUS AND COMPOSITION FOR REMOVING POLLUTANTS FROM THE ATMOSPHERE

(75) Inventors: Ahmad Moini, Princeton; Jeffrey B. Hoke, North Brunswick; Apurva N. Shah, Edison, all of NJ (US)

(73) Assignee: Engelhard Corporation, Iselin, NJ (US)

( * ) Notice: Subject to any disclaimer, the term of this patent is extended or adjusted under 35 U.S.C. 154(b) by 0 days.

(21) Appl. No.: 09/317,723

(22) Filed: May 24, 1999

(51) Int. Cl.[7] ................................................. A61L 9/00
(52) U.S. Cl. ...................... 422/122; 428/447; 428/650; 96/154; 500/300; 500/324; 500/355
(58) Field of Search .................. 422/122; 428/447; 502/300, 324, 355; 96/154; 423/650

(56) References Cited

U.S. PATENT DOCUMENTS

| | | |
|---|---|---|
| 3,738,088 A | 6/1973 | Colosimo |
| 5,147,429 A | 9/1992 | Bartholomew |
| 5,238,897 A * | 8/1993 | Cornwell |
| 5,676,912 A * | 10/1997 | Sharma et al. |
| 5,698,165 A * | 12/1997 | Terada et al. |
| 5,989,507 A * | 11/1999 | Sung et al. |
| 6,121,189 A * | 9/2000 | Campbell et al. |

FOREIGN PATENT DOCUMENTS

| | | |
|---|---|---|
| DE | 43 18 738 | 7/1994 |
| JP | 03-086246 A * | 4/1991 |
| JP | 04-007040 A * | 1/1992 |
| JP | 05-261285 A * | 10/1993 |
| WO | WO 96/22146 | 7/1996 |
| WO | WO 96/22149 | 7/1996 |
| WO | WO 97/11769 | 4/1997 |

* cited by examiner

Primary Examiner—Robert A Dawson
Assistant Examiner—Marc S. Zimmer
(74) Attorney, Agent, or Firm—Stephen I. Miller

(57) ABSTRACT

This invention relates to a method, apparatus and composition for cleaning the atmosphere; and more particularly to a stationary substrate comprising at least one atmosphere contacting surface having a pollutant treating catalytic material coated thereon. Preferably, said catalytic material is capable of converting ozone to oxygen. Said coated substrate is advantageously non-flammable and flexible.

20 Claims, No Drawings

METHOD, APPARATUS AND COMPOSITION FOR REMOVING POLLUTANTS FROM THE ATMOSPHERE

FIELD OF THE INVENTION

This invention relates to a method, apparatus and composition for cleaning the atmosphere; and more particularly to a stationary substrate comprising at least one atmosphere contacting surface having a pollutant treating catalytic material coated thereon. Preferably, said catalytic material is capable of converting ozone to oxygen. Said coated substrate is advantageously non-flammable and flexible.

RELATED PRIOR ART

It is well-known to treat pollutants prior to their entry into the atmosphere in order to convert them to either less objectionable or non-objectionable substances. For example, it is known to treat auto engine exhaust streams catalytically to convert the contained carbon monoxide to carbon dioxide. However, there has been little effort to treat pollutants that are already contained in the atmosphere.

U.S. Pat. No. 3,738,088 discloses an air filtering assembly for cleaning pollution from the ambient air by utilizing a vehicle as a mobile cleaning device. A variety of elements are used in combination with a vehicle to clean the ambient air as the vehicle is driven through the environment. In particular, modified vehicles include ducting to control air stream velocity and direct the air to a variety of filters, electronic precipitators and catalyzed post filters.

German patent DE 43 18 738 C1 also discloses a process for the physical and chemical cleaning of outside air. Motor vehicles are used as carriers of conventional filters and/or catalysts, which do not constitute operational components of the vehicle but are used to directly clean atmospheric air.

Another approach is discussed in U.S. Pat. No. 5,147,429, which is directed to a mobile airborne air cleaning station. In particular, this patent features a dirigible for collecting air with a plurality of different types of air cleaning devices contained therein. The air cleaning devices disclosed include wet scrubbers, filtration machines, and cyclonic spray scrubbers.

The foregoing three references each teach cleaning the atmosphere by use of a substrate mounted in a mobile vehicle. Another reference, WO 96/22149 (incorporated herein by reference) discloses cleaning of the atmosphere by use of a stationary catalytic device. However, the potential flammability of such a device was not recognized.

The present invention discloses a stationary catalytic device which is preferably flexible in nature for converting ozone to oxygen thus removing this pollutant from the atmosphere. The device is advantageously non-flammable and thus more safe to use than similar prior art devices.

SUMMARY OF THE INVENTION

The present invention relates to apparatus, methods and compositions to treat the atmosphere to remove pollutants, particularly ozone, therefrom. The term "atmosphere" is defined herein as the mass of air surrounding the earth. The term "ambient air" shall mean the atmosphere which is naturally or purposefully drawn or forced towards a pollutant treating substrate. It is also intended to include air which has been heated either incidentally or by a heating means.

The present invention is generally directed to a method for treating the atmosphere comprising passing ambient air over or through a stationary substrate having at least one air contacting surface having a pollutant treating material such as a catalyst disposed thereon. The stationary substrate is made from a material that can be modified, for example by coating, to contain or support the pollutant treating material which is preferably a material useful for catalytically converting ozone to oxygen. Other pollutant treating materials are contemplated by the invention, for example, materials for treating hydrocarbons, carbon monoxide and nitrogen oxides are also contemplated. For purposes of this application, a substrate is considered stationary when it is operatively attached to a non-moving structure. For example, the outdoor components of a residential or commercial heating, ventilating, or air-conditioning system (commonly referred to as HVAC systems) are considered stationary, even though certain components that are normally present in such systems such as a fan has motion and does move.

In accordance with the present invention, the pollutant treating substrate, preferably a flexible pollutant treating substrate, is an additional component which may be added to the outdoor components of an HVAC system. Alternatively, this or a similar component may be added to the indoor components of an HVAC system in order to treat indoor air. In outdoor use, the atmosphere or ambient air either flows naturally over or through such components as by the natural action of the wind or the atmosphere or ambient air may be pulled or forced through such components by means of a fan. For example, a flexible pollutant treating substrate can be included in a device which is permanently or removably mounted on an existing HVAC air-handling system so as to provide a pollutant treating substrate in the path of the atmospheric flow without the need for substantial alteration to the existing equipment. The added substrate is preferably in the form of a flexible replaceable device, to facilitate replacement or rejuvenation of the pollutant treating material. Alternatively, the substrate may be permanently mounted in a manner which permits rejuvenating of the pollutant treating material in place.

The substrate, preferably a flexible substrate is ideally located in the down stream flow path of the ambient air being pushed or pulled through the heat exchange fins of an air conditioning condenser. Ambient air, in this case cooling air, will most normally contain pollutants such as ozone. Such condensers are generally located out of doors and are used to air cool an air conditioning fluid which is transported through coils attached to the heat exchange fins. The substrate of the invention is most preferably located in close proximity to the air stream exiting the heat exchange fins so that this warmed air stream will immediately come into contact with the pollutant conversion catalyst being supported on the substrate.

The added substrate has the advantage that it is designed not to provide substantial additional resistance to the ambient air flowing or being drawn through the HVAC components. Thus, little or no additional energy (e.g., electric energy) is required to operate the HVAC components when the additional component is in place. The preferably catalytically coated substrate also has the advantage of being non-flammable.

A key aspect of the present invention is that it is directed to reducing levels of pollutants such as ozone already present in the atmosphere. The ambient air may be drawn over the substrate by natural wind currents or by the use of an air drawing means such as a fan or the like to draw or force ambient air into operative contact with the substrate having the pollutant treating composition thereon.

In a preferred embodiment of the present invention, the ozone treating process is carried out by means of a flexible substrate supporting an ozone treating catalyst at or below ordinary room temperature, which is defined for purposes of this invention as about 25° C. Catalysts which can operate at below ordinary room temperatures are desirable because they do not require additional heating.

In another embodiment, the ozone treating process is carried out at temperatures above the 25° C. ordinary room temperature. Such elevated temperatures are known to improve the efficiency of catalytic processes. The elevated temperatures may be provided naturally as by the sun or by either heating the ambient air prior to its contact with the substrate, by heating the substrate, or by heating both. Such heating may be the result of purposefully heating the air or the surface, or by the use of a system in which the air or the surface is normally at a temperature above 25° C. such as an operating condenser coil of the outdoor component of a HVAC system. Typically, such condenser coils operate at about 40°–50° C. and as described above, will raise the temperature of the ambient air flowing therethrough.

The preferred embodiment of the present invention is directed to compositions, methods and articles to treat ozone already present in the atmosphere. The atmosphere may typically comprise from 0 to 400 parts, more typically 1 to 300, and yet more typically 1 to 200, parts per billion (ppb) ozone. The National Ambient Air Quality Standard for ozone is 120 ppb.

Ozone treating compositions comprise catalysts useful for catalyzing the conversion of ozone present in the atmosphere to oxygen as well as other materials necessary to adhere the catalyst to the substrate, for example, binders. For purposes of the present invention, the preferred ozone treating catalyst compositions are comprised of the following ingredients in the ranges specified in Table A.

TABLE A

| Ingredient | Supplier | Function | Quantity (% solids based on $MnO_2$ + Gibbsite) |
|---|---|---|---|
| Gibbsite (Micral 916 Alumina Trihydrate) | J.M. Huber Corporation 4940 Peachtree Industrial Blvd. Suite 340 Norcross, GA 30071 | Fire retardant | 10–50% |
| HSA $MnO_2$ | Chemetals, Inc. 610 Pittman Road Baltimore, MD 21226 | Catalyst | 50–90% |
| Rhodoline 226/35 | Rhodia Inc. Surfactants & Specialties CN 7500 Prospect Plains Road Cranbury, NJ 08512 | Dispersant | 1–10% |
| Attagel 50 | Engelhard Corporation 101 Wood Avenue Iselin, NJ 08830 | Suspension aid | 0–30% |
| Sodium Carboxymethyl Cellulose (XLO-HVP) | Akzo Chemicals BV P.O. Box 975 3800 AZ Amersfoort The Netherlands | Thickener | 0–5% |
| Rhoplex P-376 | Rohm & Haas Company 100 Independence Mall West Philadelphia, PA 19106 | Binder | 2–20% |
| Silres M 50E | Wacker Chemie GmbH Werk Burghausen Postfach 1260 D-84480 Burghausen/Obb. GERMANY | Binder | 1–10% |
| Rhodasurf BC-720 | Rhodia Inc. Surfactants & Specialties CN 7500 Prospect Plains Road Cranbury, NJ 08512 | Wetting Agent | 0–2% |
| Nuosept 95 | Creanova Inc. Turner Place, Box 365 Piscataway, NJ 08855 | Preservative | 0–1.0% |

Equivalents for the above ingredients are also contemplated by the invention, for example, other types of alumina trihydrate, high surface area alumina, silica-alumina, silica, alkaline earth oxides, magnesium aluminum hydroxides, some transition metal oxides, antimony oxide, and silicones may be used in place of gibbsite. Other silicone-based binders may be substituted for Silres M50E. Other acrylic binders may be substituted for P376. The choice of such alternate materials is within the skill of the art.

In another embodiment, the $MnO_2$ Catalyst and the gibbsite may be applied to the substrate in two separate layers. In this embodiment, the substrate is first coated with a layer of gibbsite and dried. A second layer comprising manganese oxide is then coated over the gibbsite layer and then dried. The coated substrate prepared in this manner exhibits good catalytic and flammability properties.

The substrates which support the catalyst composition are chosen from among flexible substrates such as polyurethane foam, non-woven polymers such as polyester and polyethylene, bonded aluminum and related metal substrates, and fiberglass, among others. The foam thickness may vary from about 0.25 inches to 0.75 inches and may be chosen in accordance with the particular application of use. The preferred flexible substrate for purposes of the invention is antimony oxide-treated polyurethane foam R030 available from Custom Foam, Newark, N.J.

The flexible substrate can be loaded with a suitable amount of catalyst, for example from about 0.05 to about 0.75 g/in$^3$, determined based on total solids. Such loading may be chosen by one skilled in the art depending upon, for example, the average ozone concentration in the ambient air, the space velocity of the ambient air through the flexible substrate, etc. For purposes of the invention, the preferred catalyst loading is 0.25 to 0.35 g/in$^3$. The preferred loading is dependent on the composition, for example gibbsite content, of the slurry formulation.

The coated flexible substrate is active for ozone conversion under high space velocities and at temperatures from as low as about 0° C. Elevating the temperature will increase the rate of ozone conversion to oxygen. Temperatures as high as 150° C. can be used for the present invention. It may be possible to use higher temperatures by modifying the formulation or using alternative substrates.

When tested in accordance with the published Underwriters Laboratories Standard for Safety for Test for Flammability of Plastic Materials for Parts in Devices and Appliances, UL 94, Fifth Edition, Oct. 29, 1996, revised as of Jul. 10, 1998, devices prepared in accordance with the present invention passed the UL-94 requirements to be rated. Prior art ozone catalyst formulations such as those disclosed in WO96/22146, WO97/11769 and WO96/22149 when coated on polyurethane foam did not pass the UL94 procedure.

The present invention is illustrated further by the following examples which are not intended to limit the scope of the invention.

EXAMPLE 1

A slurry formulation was prepared according to the ingredient and procedure described in Table 1. This slurry was used to coat polyurethane foams.

TABLE 1

| Item No. | Ingredient | Concentration of active Component | Amount (g) | Active Component as % of (Gibbsite + $MnO_2$) | Experimental Details |
| --- | --- | --- | --- | --- | --- |
| 1 | $MnO_2$ in water | 33.1% | 1105.00 | 75.0% | Prepared a 40% (by weight) slurry of $MnO_2$ in water. Ball-milled for 5 minute intervals until the mean particle size was 3.5 $\mu$m. After recovering the slurry, determined the solids content (33.1%). |
| 2 | Gibbsite in water | 36.6% | 332.45 | 25.0% | Prepared an approximate 40% (by weight) slurry of Gibbsite. Placed the slurry in a sealed jar on a roller for several minutes to ensure proper mixing. After recovering the slurry, determined the solids content (36.6%). Added this slurry to 1 in a jar and placed the sealed jar on a roller for several minutes. |
| 3 | Rhodoline 226/35 | 35% | 41.73 | 3.0% | Added this component to the mixture obtained in 2 and placed the sealed jar on a roller for 15 minutes. |
| 4 | Attagel 50 | 13% | 229.60 | 8.0% | Prepared a 13% Attagel mixture by mixing the appropriate amounts of solid and water using high shear stirring. Added this component to the mixture obtained in 3, shook the sealed container, and placed the sealed jar on a roller for 5 minutes. |
| 5 | XLO HVP | 2.5% | 486.85 | 2.5% | Prepared a 2.5% XLO HVP mixture by dissolving the appropriate amount of solid in water. Added this component to the mixture obtained in 4 and placed the sealed jar on a roller for 5 minutes. |
| 6 | BC-720 | 99.5% | 2.45 | 0.5% | Added this component to the mixture obtained in 5 and placed the sealed jar on a roller for 5 minutes. |
| 7 | P376 | 50% | 87.63 | 9.0% | Added this component to the mixture obtained in 6 and placed the sealed jar on a roller for 5 minutes. |
| 8 | Silres M 50E | 50% | 29.21 | 3.0% | Added this component to the mixture obtained in 7 and placed the sealed jar on a roller for 5 minutes. |
| 9 | Nuosept 95 | 100% | 2.38 | 0.48% | Added this component to the mixture obtained in 8 and placed the sealed jar on a roller for 5 minutes. |

EXAMPLE 2

Coated polyurethane foam using product of Example 1. The slurry described in Example 1 was used to coat an antimony oxide treated R030 polyurethane foam (flame retardant foam, 35–37 ppi, ⅜ inch) available from Custom Foam, Newark, N.J. The foam was dipped in the slurry, excess slurry was allowed to drip off, and then an air knife was used to further remove excess slurry from the foam. The resulting coated foam was dried at 90° C. Total loading of solids on the foam was 0.29 g/in³. To test the flammability behavior, a strip (approximately three inches long and approximately 0.5 inches wide) was placed in contact with an open flame for approximately 5 seconds. This test takes place in a vented hood with air flow (750 cu. ft./min. volume flow rate, 120 ft./min. velocity). Upon such contact, the foam smoldered for a period of time, and the smoke seemed to move down the strip, but it ultimately extinguished itself.

A separate preparation, similar to the composition described in Example 1, and coated in the same manner described in the present example, with a loading of 0.297 g/in³, successfully passed a UL-94 flammability test.

The catalytic properties of this coated foam appear in Table 2.

TABLE 2

Catalytic Results for Product of Example 2

| Space Velocity (1/hr.) | Ozone Conversion (%) |
|---|---|
| 200,000 | 85.3 |
| 400,000 | 64.9 |
| 600,000 | 51.8 |

250–290 ppb inlet ozone, 45° C., Dewpoint = 15

EXAMPLE 3

$MnO_2$ Slurry Formulation

A $MnO_2$ slurry, containing no gibbsite, was prepared in a similar manner as described in Example 1. The ingredients and respective amounts are listed in Table 3. Aside from elimination of gibbsite from the synthesis, the procedure is identical to that described in Example 1.

TABLE 3

Ingredients for Synthesis of Slurry of Example 3

| Item No. | Ingredient | Concentration of Active Component | Amount (g) | Active Component as % of $MnO_2$ |
|---|---|---|---|---|
| 1 | $MnO_2$ in Water | 34.5% | 1993.00 | 100% |
| 2 | Rhodoline 226/35 | 35% | 58.94 | 3.0% |
| 3 | Attagel 50 | 13% | 423.13 | 8.0% |
| 4 | XLO HVP | 2.5% | 687.59 | 2.5% |
| 5 | BC-720 | 99.5% | 3.46 | 0.5% |
| 6 | P376 | 50% | 123.77 | 9.0% |
| 7 | Silres M | 50% | 41.26 | 3.0% |
| 8 | Nuosept 95 | 100% | 3.33 | 0.48% |

Coating a flame retardant polyurethane foam (R030) with this slurry, at loading of 0.3 g/in³, resulted in a product that would aggressively smolder and smoke until all of the coating, as well as some of the foam was consumed. Other preparations of the same slurry composition, loaded onto a foam at loadings as low as 0.1 g/in³, still had the same smoldering behavior.

EXAMPLE 4

Gibbsite Slurry Formulation

A gibbsite slurry, containing no $MnO_2$, was prepared in a similar manner as described in Example 1. The ingredients and respective amounts are listed in Table 4. Aside from elimination of $MnO_2$ from the synthesis, the procedure is identical to that described in Example 1.

TABLE 4

Ingredients for Synthesis of Slurry of Example 4

| Item No. | Ingredient | Concentration of Active Component | Amount (g) | Active Component as % of Gibbsite |
|---|---|---|---|---|
| 1 | Gibbsite in water | 35.3% | 2095.60 | 100.0% |
| 2 | Rhodoline 226/35 | 35% | 63.46 | 3.0% |
| 3 | Attagel 50 | 13% | 455.62 | 8.0% |
| 4 | XLO HVP | 2.5% | 740.38 | 2.5% |
| 5 | BC-720 | 99.5% | 3.72 | 0.5% |
| 6 | P376 | 50% | 133.27 | 9.0% |
| 7 | Silres M | 50% | 44.42 | 3.0% |
|   | Nuosept 95 | 100% | 3.54 | 0.48% |

EXAMPLE 5

$MnO_2$/Gibbsite Slurry Formulation (25% Gibbsite)

The appropriate amounts of the $MnO_2$ slurry (Example 3) and gibbsite slurry (Example 4) were blended to form a $MnO_2$/gibbsite slurry corresponding to 25% gibbsite, measured as mass of gibbsite relative to the sum of the masses of gibbsite and $MnO_2$. This procedure, involving the combination of two formulated slurries, represents a different and more flexible approach from that described in Example 1.

EXAMPLE 6

Coated Polyurethane Foam Using Product of Example 5

The slurry described in Example 5 was used to coat a R030 polyurethane foam (flame-retardant foam, 35–37 ppi, ⅜ inch). The procedure was similar to Example 2. Total loading of solids on the foam was 0.31 g/in³. When tested by the procedure described in Example 2, the foam had good resistance to flammability.

The catalytic properties of this coated foam appear in Table 5.

TABLE 5

Catalytic Results for Product of Example 6

| Space Velocity (1/hr.) | Ozone Conversion (%) |
|---|---|
| 200,000 | 91.3 |
| 400,000 | 71.4 |
| 600,000 | 57.5 |

240–270 ppb inlet ozone, 45° C., Dewpoint = 15

EXAMPLE 7

$MnO_2$/Gibbsite Slurry Formulation (18% Gibbsite)

The appropriate amounts of the $MnO_2$ slurry (Example 3) and gibbsite slurry (Example 4) were blended to form a MnO$_2$/gibbsite slurry corresponding to 18% gibbsite, measured as mass of gibbsite relative to the sum of the masses of gibbsite and MnO$_2$.

EXAMPLE 8

Coated Polyurethane Foam Using Product of Example 7 (Comparative Example)

The slurry described in Example 7 was used to coat a R030 polyurethane foam (flame-retardant foam, 35–37 ppi, ⅜ inch). The procedure was similar to Example 2. This foam did not have satisfactory flammability properties. When tested by the procedure described in Example 2, it smoldered and smoked until all of the coating on the strip, as well as part of the foam, were consumed.

EXAMPLE 9

MnO$_2$/Alumina Slurry Formulation (75% Alumina)

A slurry formulation was prepared according to the ingredients and procedure described in Table 6. The SRS II alumina was obtained from Grace.

This slurry was used to coat PU foams.

TABLE 6

The ingredients and procedure for synthesis of slurry of Example 9

| Item No. | Ingredient | Concentration of active component | Amount (g) | Active component as % of (Gibbsite + MnO$_2$) | Experimental details |
|---|---|---|---|---|---|
| 1 | MnO$_2$ in water | 34.3% | 240.00 | 25.0% | Prepared a 40% (by weight) slurry of MnO$_2$. Ball-milled for 5 minute intervals until the mean particle size was 3.5 μm. After recovering the slurry, determined the solids content (34.3%). |
| 2 | Alumina (SRS II) in water | 25.4% | 969.60 | 75.0% | Prepared a ~40% (by weight) slurry of Alumina in a jar. Placed the sealed jar on a roller for several minutes to ensure proper mixing. After recovering the slurry, determined the solids content 25.4%. Added this slurry to 1 in a jar and placed the sealed jar on a roller for several minutes. |
| 3 | Rhodoline 226/35 | 35% | 28.14 | 3.0% | Added this component to the mixture obtained in 2 and placed the sealed jar on a roller for 15 minutes. |
| 4 | Attagel 50 | 13% | 202.05 | 8.0% | Prepared a 13% Attagel mixture by mixing the appropriate amounts of solid and water using high shear stirring. Added this component to the mixture obtained in 3, shook the sealed container, and placed the sealed jar on a roller for 5 minutes. |
| 5 | XLO HVP | 2.5% | 328.33 | 2.5% | Prepared a 2.5% XLO HVP mixture by dissolving the appropriate amount of solid in water. Added this component to the mixture obtained in 4 and placed the sealed jar on a roller for 5 minutes. |
| 6 | BC-720 | 99.5% | 1.65 | 0.5% | Added this component to the mixture obtained in 5 and placed the sealed jar on a roller for 5 minutes. |
| 7 | P376 | 50% | 59.10 | 9.0% | Added this component to the mixture obtained in 6 and placed the sealed jar on a roller for 5 minutes. |
| 8 | Silres M 50E | 50% | 19.70 | 3.0% | Added this component to the mixture obtained in 7 and placed the sealed jar on a roller for 5 minutes. |
| 9 | Nuosept 95 | 100% | 1.85 | 0.48% | Added this component to the mixture obtained in 8 and placed the sealed jar on a roller for 5 minutes. |

EXAMPLE 10

Coated Polyurethane Foam Using Product of Example 9

The slurry described in Example 9 was used to coat a R030 PU foam (flame-retardant foam, 35–37 ppi, ⅜ inch). The foam was dipped in the slurry, excess slurry was allowed to drip off, and then an air knife was used to further remove excess slurry from the foam. The resulting coated foam was dried at 90° C. Total loading of solids on the foam was 0.33 g/in$^3$. The foam had good resistance to flammability. To test this behavior, a strip (~3 in. long and ~0.5 in. wide) was placed in contact with an open flame for ~5 seconds, as discussed previously in Example 2. Upon such contact, the foam smoldered for a period of time, and the smoke seemed to move down the strip, but it ultimately extinguished itself. This sample also successfully passed UL-94 flammability test.

An additional piece of foam was coated with the slurry of Example 9 at a loading of 0.36 g/in$^3$. The catalytic properties of this coated foam appear in Table 7.

EXAMPLE 11

Manganese Oxide Impregnated on Alumina—Solid and Slurry

A catalyst powder was prepared in the following manner. 9.60 g $Mn(NO_3)_2$ solution (45–50 wt. %) was diluted with 15.4 g water. This solution was added to 20.00 g. of SRS II alumina by incipient wetness impregnation. The resulting solid was first allowed to air dry, then placed in an oven and gradually heated to 125° C. This material was then calcined at approximately 500° C. for about two hours.

A slurry formulation was prepared according to the ingredients and procedure described in Table 8. The primary ingredient listed in the table, $MnO_2$ impregnated on alumina, is the product described in the previous paragraph.

TABLE 8

The Ingredients and Procedure for Synthesis of Slurry of Example 11

| Item No. | Ingredient | Concentration of Active Component | Amount (g) | Active Component as % of Item 1 | Experimental Details |
|---|---|---|---|---|---|
| 1 | Mn oxide impregnated on alumina | 21.7% | 60.00 | 100.0% | Prepared a 40% (by weight) slurry of Mn oxide impregnated on alumina. Ballmilled for 5 minute intervals until the mean particle size was 3.5 μm. After recovering the slurry, determined the solids content (21.7%). |
| 2 | Rhodoline 226/35 | 35% | 1.12 | 3.0% | Added this component to the mixture obtained in 1 and placed the sealed jar on a roller for 15 minutes. |
| 3 | Attagel 50 | 13% | 8.01 | 8.0% | Prepared a 13% Attagel mixture by mixing the appropriate amounts of solid and water using high shear stirring. Added this component to the mixture obtained in 2, shook the sealed container, and placed the sealed jar on a roller for 5 minutes. |
| 4 | XLO HVP | 2.5% | 13.02 | 2.5% | Prepared a 2.5% XLO HVP mixture by dissolving the appropriate amount solid in water. |
| 5 | BC-720 | 99.5% | 0.07 | 0.5% | Added this component to the mixture obtained in 4 and placed the sealed jar on a roller for 5 minutes. |
| 6 | P376 | 50% | 2.34 | 9.0% | Added this component to the mixture obtained in 5 and placed the sealed jar on a roller for 5 minutes. |
| 7 | Silres M 50E | 50% | 0.78 | 3.0% | Added this component to the mixture obtained in 6 and placed the sealed jar on a roller for 5 minutes. |
| 8 | Nuosept 95 | 100% | 0.09 | 0.48% | Added this component to the mixture obtained in 7 and placed the sealed jar on a roller for 5 minutes. |

TABLE 7

Catalytic results for product of Example 10

| Space Velocity (1/hr) | Ozone conversion (%) |
|---|---|
| 200,000 | 82.7 |
| 400,000 | 55.5 |
| 600,000 | 40.9 |

250–290 ppb inlet ozone, 45° C., Dewpoint = 15

EXAMPLE 12

Coated Polyurethane Foam Using Product of Example 11

The slurry described in Example 11 was used to coat a T030 PU foam (flame-retardant foam, 30 ppi, ⅜ inch). The foam was dipped in the slurry, excess slurry was allowed to drip off, and then an air knife was used to further remove excess slurry from the foam. The resulting coated foam was dried at 90° C. Total loading of solids on the foam was 0.44 g/in$^3$. The foam had good resistance to flammability. To test this behavior, a strip (~3 in. long and ~0.5 in. wide) was placed in contact with an open flame for ~5 seconds, as discussed previously. Upon such contact, the foam smoldered for a period of time, and the smoke seemed to move down the strip, but it ultimately extinguished itself. The catalytic properties of this coated foam appear in Table 9.

TABLE 9

Coated Polyurethane Foam Using Product of Example 11

| Space Velocity (1/hr) | Ozone Conversion |
|---|---|
| 200,000 | 83.6 |
| 400,000 | 60.1 |
| 600,000 | 41.8 |

250–290 ppb inlet ozone, 45° C., Dewpoint = 15

EXAMPLE 13

Coated Polyurethane Foam Using $MnO_2$ Impregnated on Alumina

A solid catalyst was prepared in a manner similar to that of Example 11 but with lower manganese content. In such a synthesis, 6.16 g $Mn(NO_3)_2$ solution (45–50 wt. %) is diluted with 15.4 g water, and added to 20.00 g SRS II alumina.

The resulting product may be used to prepare a slurry similar to that of Example 11.

One such slurry was used to coat a R030 PU foam (flame-retardant foam, 35–37 ppi, 3/8 inch). The foam was dipped in the slurry, excess slurry was allowed to drip off, and then an air knife was used to further remove excess slurry from the foam. The resulting coated foam was dried at 90° C. Total loading of solids on the foam was 0.32 g/in$^3$ in. The foam had good resistance to flammability. To test this behavior, a strip (~3 in. long and ~0.5 in. wide) was placed in contact with an open flame for ~5 seconds, as discussed previously. Upon such contact, the foam smoldered for a period of time, and the smoke seemed to move down the strip, but it ultimately extinguished itself. This sample also passed UL-94 flammability test.

An additional foam was coated with the above slurry at a loading of 0.45 g/in$^3$. The catalytic properties of this coated foam appear in Table 10.

TABLE 10

Catalytic Results for Product of Example 13

| Space Velocity (1/hr) | Ozone Conversion (%) |
|---|---|
| 200,000 | 93.8 |
| 400,000 | 76.8 |
| 600,000 | 58.8 |

250–290 ppb inlet ozone, 45° C., Dewpoint = 15

What is claimed is:

1. A process for catalytically treating ozone, hydrocarbons, carbon monoxide, and nitrogen oxides in the atmosphere by passing ambient air over or through an essentially non-flammable device comprising a substrate having at least one air contacting surface wherein said surface is coated with a mixture comprising:
   (a) at least one catalytic material; and
   (b) gibbsite.

2. The process claimed in claim 1 for treating ozone.

3. The process claimed in claim 2 wherein the catalytic material comprises manganese oxide.

4. The process claimed in claim 3 which further comprises a binder.

5. The process claimed in claim 4 wherein the binder is a silicone binder.

6. The process claimed in claim 2 wherein the pollutant treating material comprises manganese oxide supported on alumina.

7. The process claimed in claim 6 which further comprises a binder.

8. The process claimed in claim 7 wherein the binder is a silicone binder.

9. The process claimed in claim 1 wherein the substrate is flexible.

10. The process claimed in claim 9 for treating ozone.

11. The process claimed in claim 10 wherein the pollutant treating material comprises manganese oxide.

12. The process claimed in claim 11 which farther comprises a binder.

13. The process claimed in claim 11 wherein the binder is a silicone binder.

14. The process claimed in claim 10 wherein the pollutant treating material comprises manganese oxide supported on alumina.

15. The process claimed in claim 14 which further comprises a binder.

16. The process claimed in claim 15 wherein the binder is a silicone binder.

17. A process for catalytically treating ozone, hydrocarbons, carbon monoxide, and nitrogen oxides in the atmosphere by passing ambient air over or through an essentially non-flammable device comprising a substrate having at least one air contacting surface wherein said surface is coated with two separate layers; the first of said layers comprising gibbsite and the second of said layers comprising a catalytic material.

18. The process claimed in claim 17 wherein the catalytic material comprises manganese oxide.

19. The process claimed in claim 17 wherein the catalytic material comprises manganese oxide supported on alumina.

20. The process claimed in claim 17 wherein the substrate is flexible.

* * * * *